(12) United States Patent
Asif et al.

(10) Patent No.: US 11,769,150 B2
(45) Date of Patent: Sep. 26, 2023

(54) TRANSACTION SCHEDULING FOR BLOCK SPACE ON A BLOCKCHAIN

(71) Applicant: International Business Machines Corporation, Armonk, NY (US)

(72) Inventors: Muhammad Tayyab Asif, Singapore (SG); Pralhad D. Deshpande, Singapore (SG)

(73) Assignee: International Business Machines Corporation, Armonk, NY (US)

(*) Notice: Subject to any disclaimer, the term of this patent is extended or adjusted under 35 U.S.C. 154(b) by 151 days.

(21) Appl. No.: 15/730,030

(22) Filed: Oct. 11, 2017

(65) Prior Publication Data

US 2019/0108519 A1 Apr. 11, 2019

(51) Int. Cl.
| | |
|---|---|
| *G06Q 20/00* | (2012.01) |
| *G06Q 20/40* | (2012.01) |
| *H04L 9/32* | (2006.01) |
| *H04L 9/40* | (2022.01) |
| *H04L 9/00* | (2022.01) |

(52) U.S. Cl.
CPC ......... *G06Q 20/401* (2013.01); *G06Q 20/405* (2013.01); *H04L 9/3236* (2013.01); *G06Q 2220/00* (2013.01); *H04L 9/50* (2022.05); *H04L 63/08* (2013.01)

(58) Field of Classification Search
CPC ............................ G06Q 20/401; G06Q 20/405
See application file for complete search history.

(56) References Cited

U.S. PATENT DOCUMENTS

| | | | | |
|---|---|---|---|---|
| 10,305,833 | B1* | 5/2019 | Dennis | H04L 9/088 |
| 10,397,328 | B2* | 8/2019 | Bohli | H04L 67/108 |
| 2004/0215688 | A1* | 10/2004 | Frank | H04L 12/28 |
| | | | | 709/200 |
| 2009/0157992 | A1* | 6/2009 | Guo | G06F 16/245 |
| | | | | 711/167 |
| 2010/0146138 | A1* | 6/2010 | Ng | H04L 65/80 |
| | | | | 709/231 |
| 2013/0042032 | A1* | 2/2013 | Mannava | G06F 13/364 |
| | | | | 710/52 |
| 2015/0189011 | A1* | 7/2015 | Hunt | H04L 67/108 |
| | | | | 709/219 |
| 2017/0147975 | A1 | 5/2017 | Natarajan et al. | |
| 2017/0180469 | A1 | 6/2017 | Ford et al. | |
| 2017/0287068 | A1* | 10/2017 | Nugent | G06Q 20/08 |
| 2017/0329980 | A1* | 11/2017 | Hu | G06F 21/78 |
| 2017/0352031 | A1* | 12/2017 | Collin | H04L 9/3239 |
| 2018/0091524 | A1* | 3/2018 | Setty | H04L 9/3247 |
| 2018/0109541 | A1* | 4/2018 | Gleichauf | H04L 67/1097 |

(Continued)

OTHER PUBLICATIONS

Information Propogation in the Bitcoin Network, Decker, IEEE (Year: 2013).*

(Continued)

*Primary Examiner* — Jacob C. Coppola
*Assistant Examiner* — Terry Nathan Murray (57) ABSTRACT

An example operation may include one or more of identifying a transaction from a blockchain node to be committed to a blockchain, determining a current amount of block space reserved by other blockchain nodes of the blockchain from a schedule, determining whether there is enough block space available for the transaction, and creating a block space reservation for the transaction.

20 Claims, 7 Drawing Sheets

(56) References Cited

U.S. PATENT DOCUMENTS

2018/0267539 A1* 9/2018 Shih .................... G05D 1/0295
2018/0294955 A1* 10/2018 Rhie .................... H04L 9/0637
2018/0341930 A1* 11/2018 Moir .................... H04L 9/3247
2019/0140935 A1* 5/2019 Kikinis ............. G06Q 20/0655

OTHER PUBLICATIONS

Plasma: Scalable Autonomous Smart Contracts, Poon, Plasma (Year: 2017).*
Idrissa Sarr et al., Blockchain-based Model for Social Transactions Processing, International Conference on Data Management Technologies and Applications (DATA), at Colmar, Jul. 2015, Research Gate, Please refer to Abstract and Section 1.
Thomas Dickerson et al., Adding Concurrency to Smart Contracts, arXiv:1702.04467v1 [cs.DC], Feb. 15, 2017, Publisher: Cornell University Library, Please refer to Abstract and Section 1 and 4.
Alex Coventry et al., NooShare: A decentralized ledger of shared computational resources, Source: http://web.mit.edu/alex_c/www/nooshare.pdf , Publisher: Semantic Scholar, Please see Section1.

* cited by examiner

TRANSACTION SCHEDULING FOR BLOCK SPACE ON A BLOCKCHAIN

TECHNICAL FIELD

This application generally relates to scheduling transaction commitment, and more particularly, transaction scheduling for block space on a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

Consensus delays can lead to failed blockchain updates. For example, when a transaction is ready for commitment and is presented via one or more blockchain members, the transaction should be written to a currently utilized blockchain block without delay. However, block size remaining may not be sufficient to commit a current blockchain block and consensus by blockchain peers or leaders may be required sooner rather than later to avoid other delays. Also, once consensus is reached the update which includes the newest blockchain transaction may fail since the space of the block which was previously available may no longer be available, and thus the transaction commitment will fail and the transaction is no longer able to be written to a blockchain.

SUMMARY

One example embodiment may provide a method that includes one or more of identifying a transaction from a blockchain node to be committed to a blockchain, determining a current amount of block space reserved by other blockchain nodes of the blockchain from a schedule, determining whether there is enough block space available for the transaction, and creating a block space reservation for the transaction.

Another example embodiment may include a processor configured to perform one or more of identify a transaction from a blockchain node to be committed to a blockchain, determine a current amount of block space reserved by other blockchain nodes of the blockchain from a schedule, determine whether there is enough block space available for the transaction, and create a block space reservation for the transaction.

Yet another example embodiment may provide a non-transitory computer readable storage medium configured to store instructions that when executed cause a processor to perform one or more of identifying a transaction from a blockchain node to be committed to a blockchain, determining a current amount of block space reserved by other blockchain nodes of the blockchain from a schedule, determining whether there is enough block space available for the transaction, and creating a block space reservation for the transaction.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to scheduling transaction commitment on a blockchain, and in another embodiment relates to using a reservation function to provide blockchain members with transaction scheduling for block space required on a blockchain.

According to example embodiments, determining a scheduling policy that blockchain nodes can utilize to schedule future/pending blockchain transactions to be committed to the blockchain may reduce failure rate of blockchain transaction commitment and optimize throughput. In addition to consensus delays as to approving a new blockchain transaction, peers may not be aware of other peers attempting to write to the blockchain in a next available blockchain memory space. A helper service or blockchain scheduling engine may provide a function(s) to effectively plan the scheduling of blockchain transactions from all blockchain members. Scheduling functionality may take into consideration, time, date, size of the transaction, an address space in a current blockchain block and other factors when providing a designated blockchain commitment reservation to a requesting blockchain member.

Figure 1:
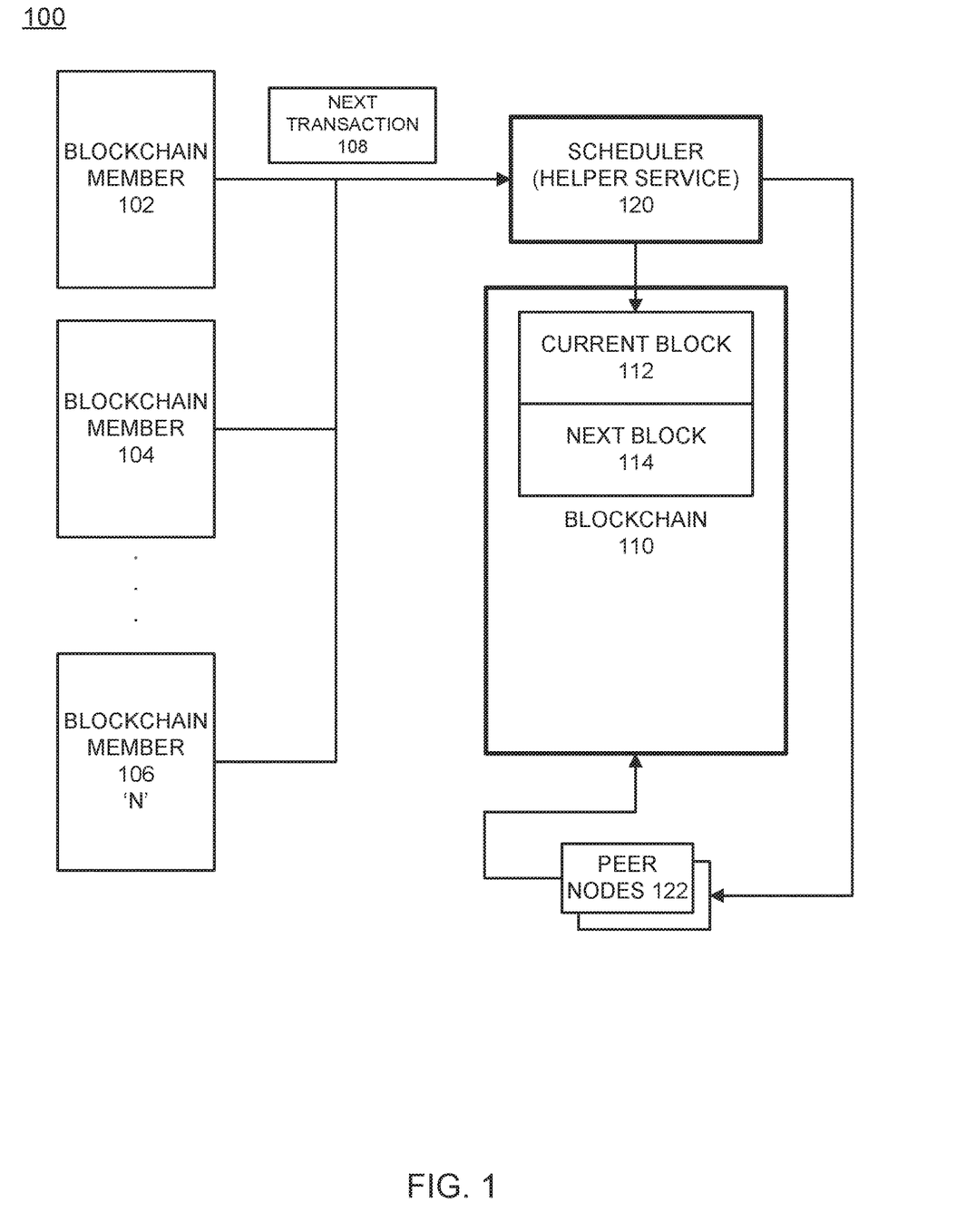
FIG. 1 illustrates a logic diagram of processing transaction scheduling via a scheduler service module, according to example embodiments.

FIG. 1 illustrates a logic diagram of processing transaction scheduling via a scheduler service module, according to example embodiments. Referring to FIG. 1, the configuration 100 provides various blockchain parties, members, nodes, peers, 102, 104, 'N' etc., which have the privilege to submit transactions for commitment to the blockchain 110. The blockchain 110 may have an external scheduling service (i.e., scheduler 120) which operates as a software based helper service to communicate with blockchain members to identify transaction requirements and determine whether the present blockchain block can accommodate such requirements. In operation, a next transaction 108 may be identified as a potential transaction for commitment to the blockchain 110.

In operation, the helper service 120 may identify when the transaction is received, a size of the transaction (i.e., KB), a priority of the transaction, assuming some members have priority over others, identifiers of the transaction, such as the blockchain member 102 or other members as representatives to the transaction, etc. An operation may be performed to obtain a block space reservation number by identifying how much total block space is currently available, this may include current blockchain transactions written to the block vs. the entire memory capacity of the block and/or all such previous reservations for the block as committed space which has yet to undergo a transaction writing procedure, but which is already assigned to other members. Assuming there is adequate space for the transaction (i.e., total available space of current block>total size of transaction), then a block space reservation number may be assigned to the requesting member 102 for the new transaction 108. In this example, the current block 112 has adequate space and there was no need to identify the space available on the next block 114 of the blockchain 110. The scheduler 120 may write an entry in a master schedule that identifies the amount of space required and the node ID of the member for reference purposes. Such information may also be used in an override procedure where one member has reserved too many portions of a block and will be locked-out temporarily until a next block is available in an effort to provide other members with block space for the current block. Ultimately, the peer nodes 122 may still be required to vote or reach consensus whether any transaction should be approved for commitment. The peers 122 may require proof that space is available and reserved in order to provide consensus that the transaction is permissible.

Figure 2:
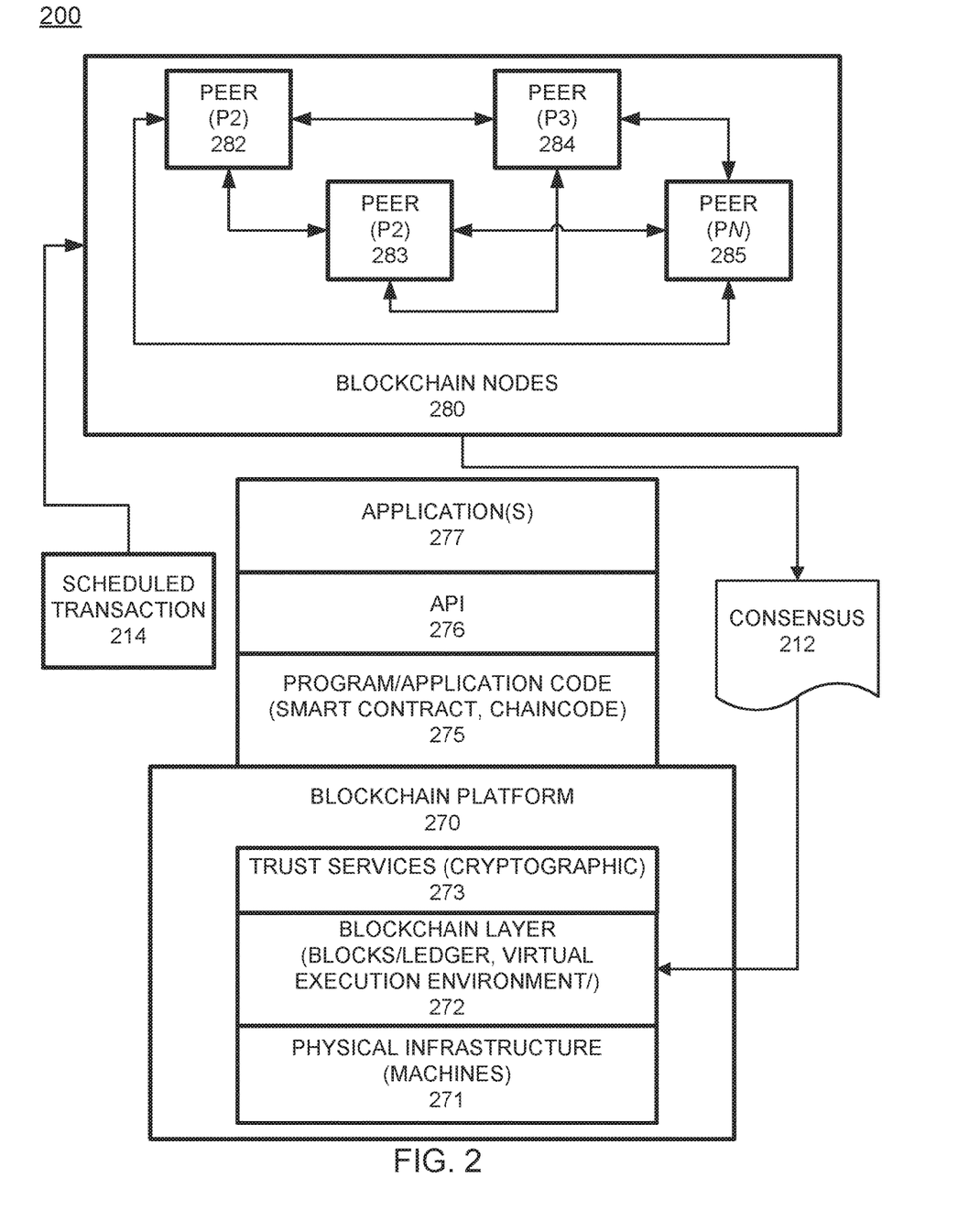
FIG. 2 illustrates an example blockchain configuration for performing blockchain transaction scheduling, according to example embodiments.

FIG. 2 illustrates an example blockchain configuration for performing block assignment and transaction scheduling, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a new transaction 214 may be identified by the peer nodes 280. The nodes may reach consensus 212 and permit the transaction to be committed to the blockchain ledger 272 provided that certain conditions are satisfied. For example, the transaction may require a reservation via the scheduler to be approved by the consensus peers. In this case, the peers may identify the schedule stored in a database outside the blockchain and determine whether the present member and the present transaction are identified as having a reservation. This information can be easily identified by transaction number, user identification number and/or size of the transaction as a commonly known parameter used to identify, verify and provide consensus to permit the transaction to be committed to the blockchain.

Figure 3:
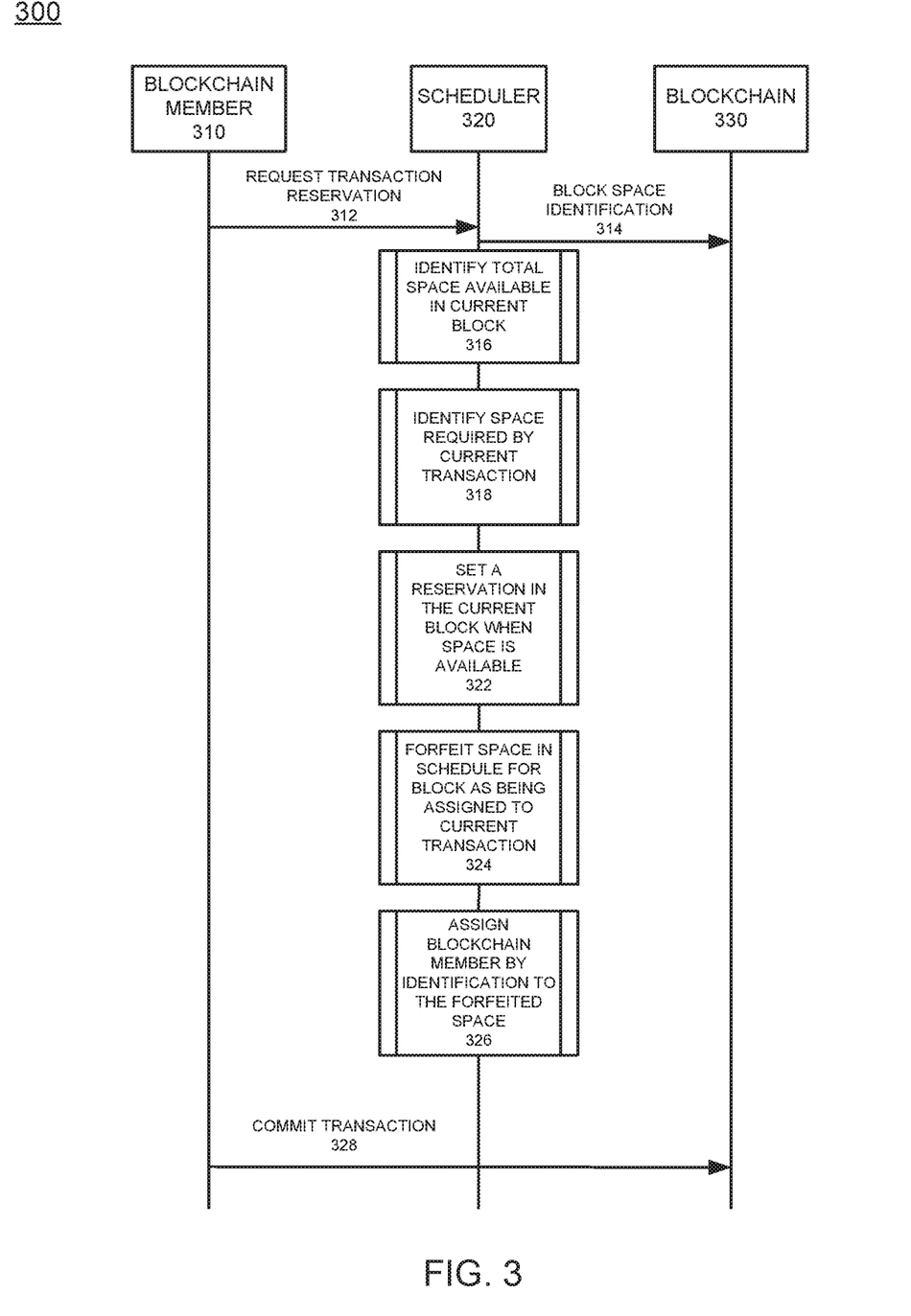
FIG. 3 illustrates a system messaging diagram for processing a blockchain transaction scheduling operation, according to example embodiments.

FIG. 3 illustrates a system messaging diagram for processing a blockchain transaction scheduling operation, according to example embodiments. Referring to FIG. 3, in this example 300 the various entities include the blockchain member 310, the scheduler 320 and the blockchain 330. The process may proceed with the blockchain member either directly via a formal request message or indirectly (i.e., through transaction submitting actions) request a reservation for the present transaction 312. The scheduler 320 may be a software module operating on a server outside the blockchain 330. The process may include identifying blockchain space 314 and the total space available 316 for transactions in a current block or in multiple blocks of the blockchain 330. The space required by the current transaction 318 may be identified by sizing the transaction or estimating depending on known transaction attributes. A reservation can then be made 322 in a current block when the space is determined to be available. The previously available space in the schedule can then be forfeited for future reservation purposes 324. This space is not only available to the proper member and/or proper transaction, which may be required to be identified prior to commitment to the blockchain. A blockchain member may be assigned by identification to the forfeited space 326, such as a schedule entry or other entry used to identify the record of the block space reserved. The blockchain member 310 may then have its transaction committed 328 at the proper time. Since reservations are made, the transactions may be prepared and stored in a queue until the available resources of the blockchain virtual machine infrastructure are available to process, identify, check, verify, and/or commit the transaction.

Figure 4A:
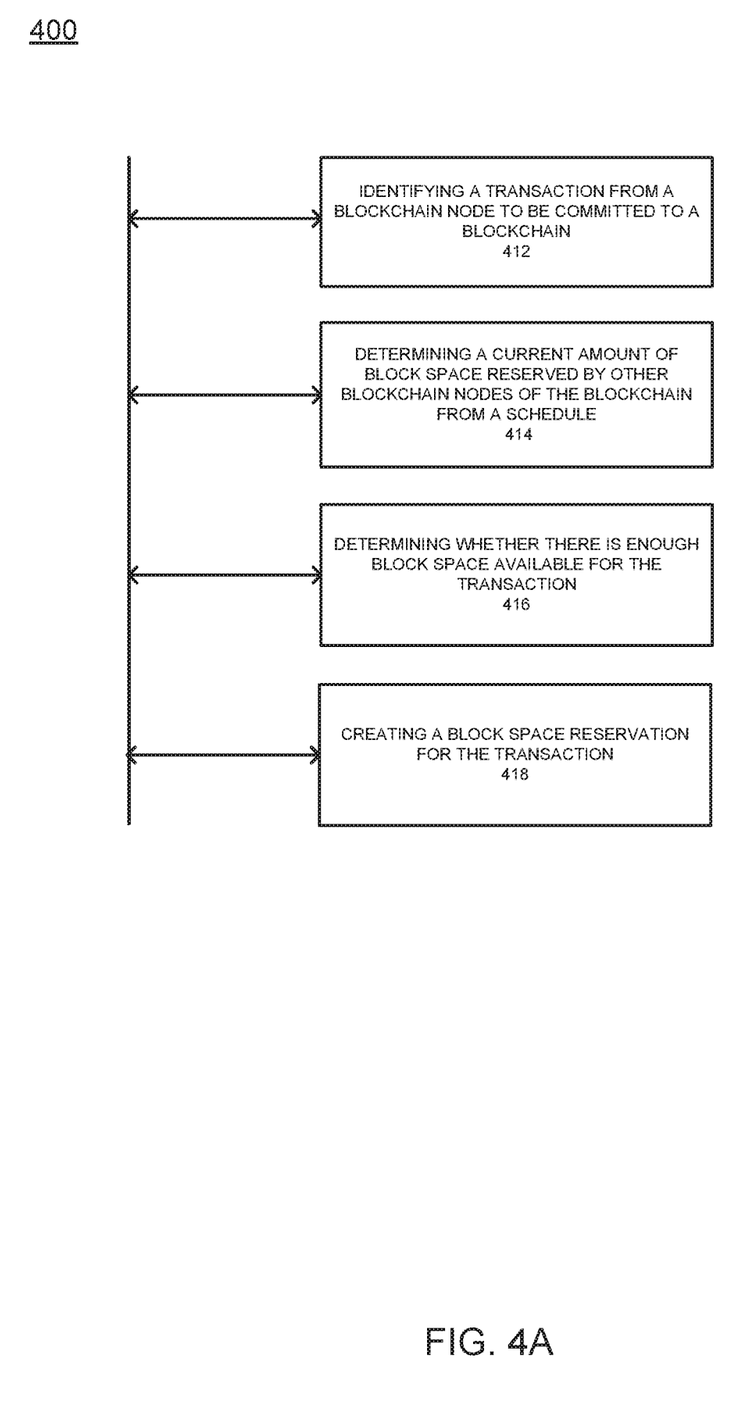
FIG. 4A illustrates a flow diagram of an example method of managing transaction scheduling, according to example embodiments.

FIG. 4A illustrates a flow diagram of an example method of scheduling blockchain transactions, according to example embodiments. Referring to FIG. 4A, the method 400 may provide identifying a transaction from a blockchain node to be committed to a blockchain 412, determining a current amount of block space reserved by other blockchain nodes of the blockchain from a schedule 414, determining whether there is enough block space available for the transaction 416, and creating a block space reservation for the transaction 418. The block space reservation includes an amount of block data required for the transaction, a requester identification associated with the blockchain node, and a block number assigned to the transaction. The method may also include identifying there is block space available for the blockchain transaction, and transmitting the block space reservation to a reservation service to prepare the transaction for commitment to the blockchain, responsive to identifying the block space is available. The method may also include revoking the block space reservation responsive to identifying the transaction will not be committed, which can free-up resources for other transactions. Also, the method may provide storing the blockchain transaction in a transaction buffer until the block space assigned to the transaction is ready for the transaction to be committed. The method further includes forfeiting available space in the block when the block space reservation is created and retrieving the forfeited available space responsive to writing the blockchain transaction to the block.

Figure 4B:
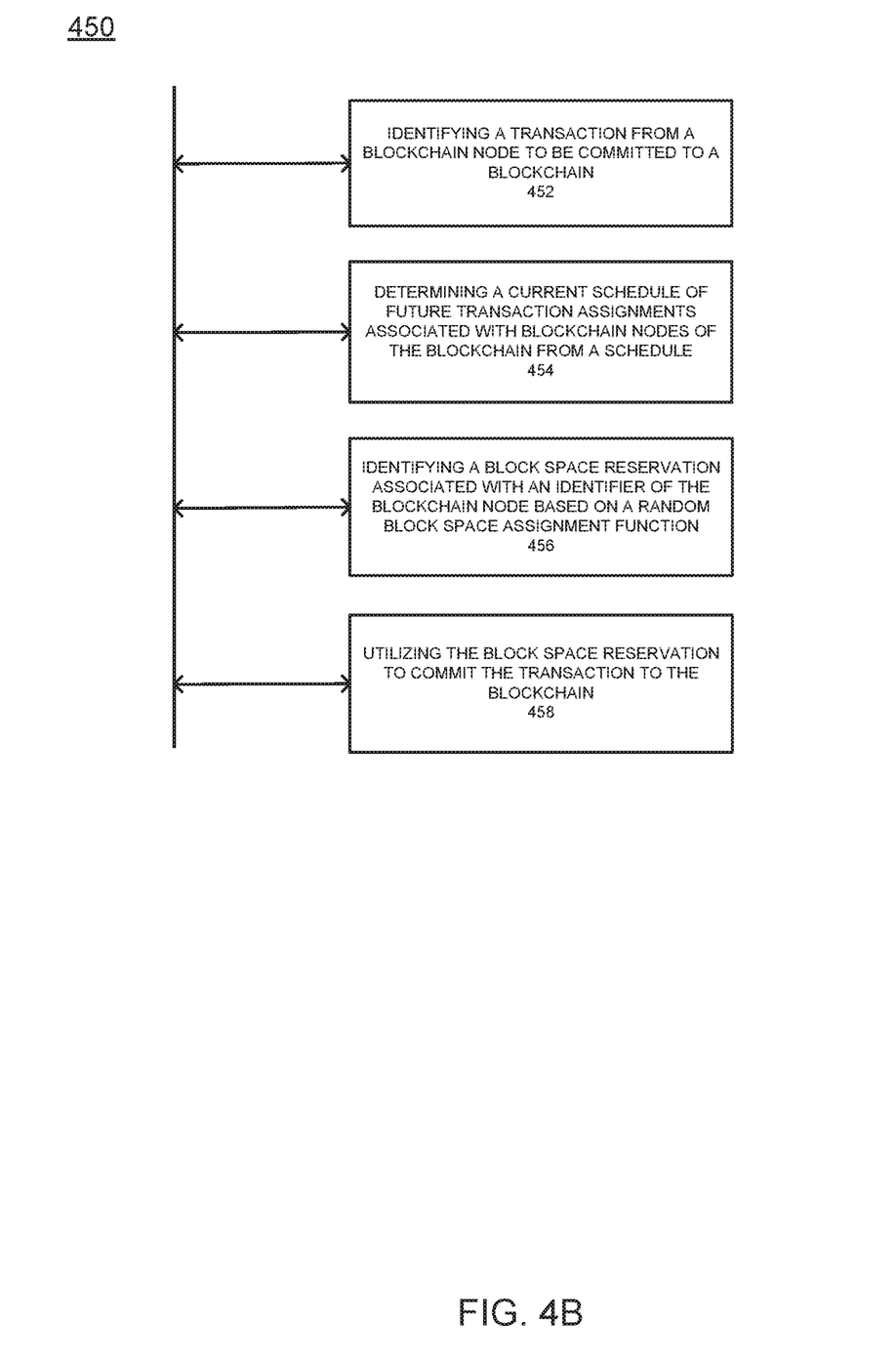
FIG. 4B illustrates another flow diagram of an example method of managing transaction scheduling, according to example embodiments.

FIG. 4B illustrates another flow diagram of an example method of scheduling blockchain transaction, according to example embodiments. Referring to FIG. 4B, the method 450 may include identifying a transaction from a blockchain node to be committed to a blockchain 452, determining a current schedule of future transaction assignments associated with blockchain nodes of the blockchain from a schedule 454, identifying a block space reservation associated with an identifier of the blockchain node based on a random block space assignment function 456, and utilizing the block space reservation to commit the transaction to the blockchain 458.

In addition to requiring a pre-scheduled authorization/assignment of block space to a particular blockchain member for committing a blockchain transaction, other approaches for assigning blockchain reservations to blockchain members may be used to effectively guarantee a block reservation identified by an address and assigned to an identifier of the blockchain members. A random assignment function may provide blockchain members with guaranteed space in any particular blockchain block, which may be assigned ahead of any transaction requiring commitment. In this example, the random assignment offers a no-favor approach to guaranteeing block space by address or other identifiers to each of the blockchain members so there is no lack of opportunity to write to a particular blockchain block.

Figure 4C:
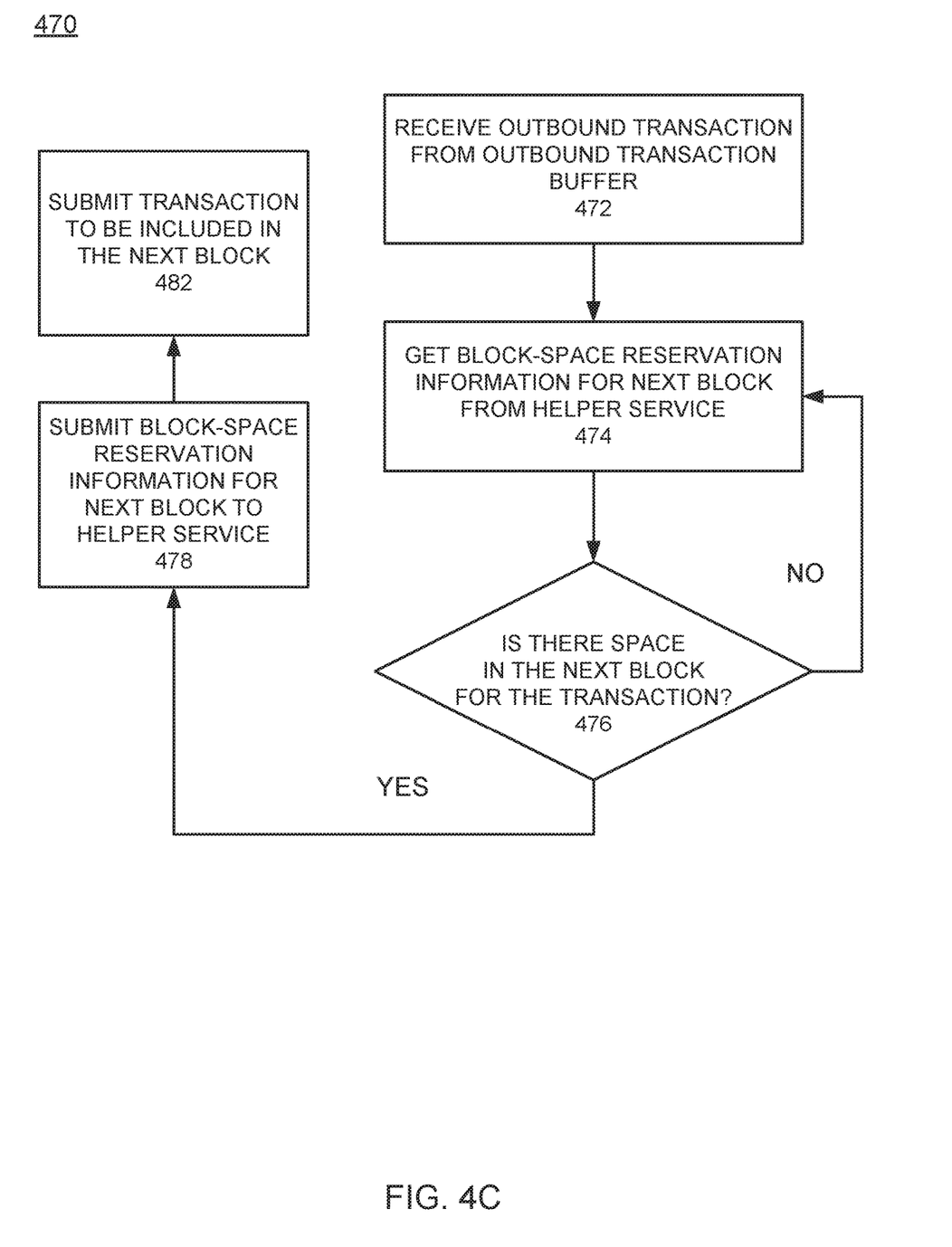
FIG. 4C illustrates logic flow diagram of an example method of managing transaction scheduling, according to example embodiments.

FIG. 4C illustrates logic flow diagram of an example method of managing transaction scheduling, according to example embodiments. Referring to FIG. 4C, the example flow diagram 470 provides a series of operations, which include receiving an outbound transaction from an outbound transaction buffer 472. This may be the result of a formulated blockchain transaction requiring commitment to the blockchain. The identification of the transaction may yield a block-space reservation request for a next block space from a helper service 474. A determination is made as to whether there is enough space available to support the transaction in the current block 476, if not the process retreats back to identify a next opportunity. If so, the process continues by submitting a block-space reservation for a next block to the helper service application 478 and submitting the transaction to be included in the next block 482.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
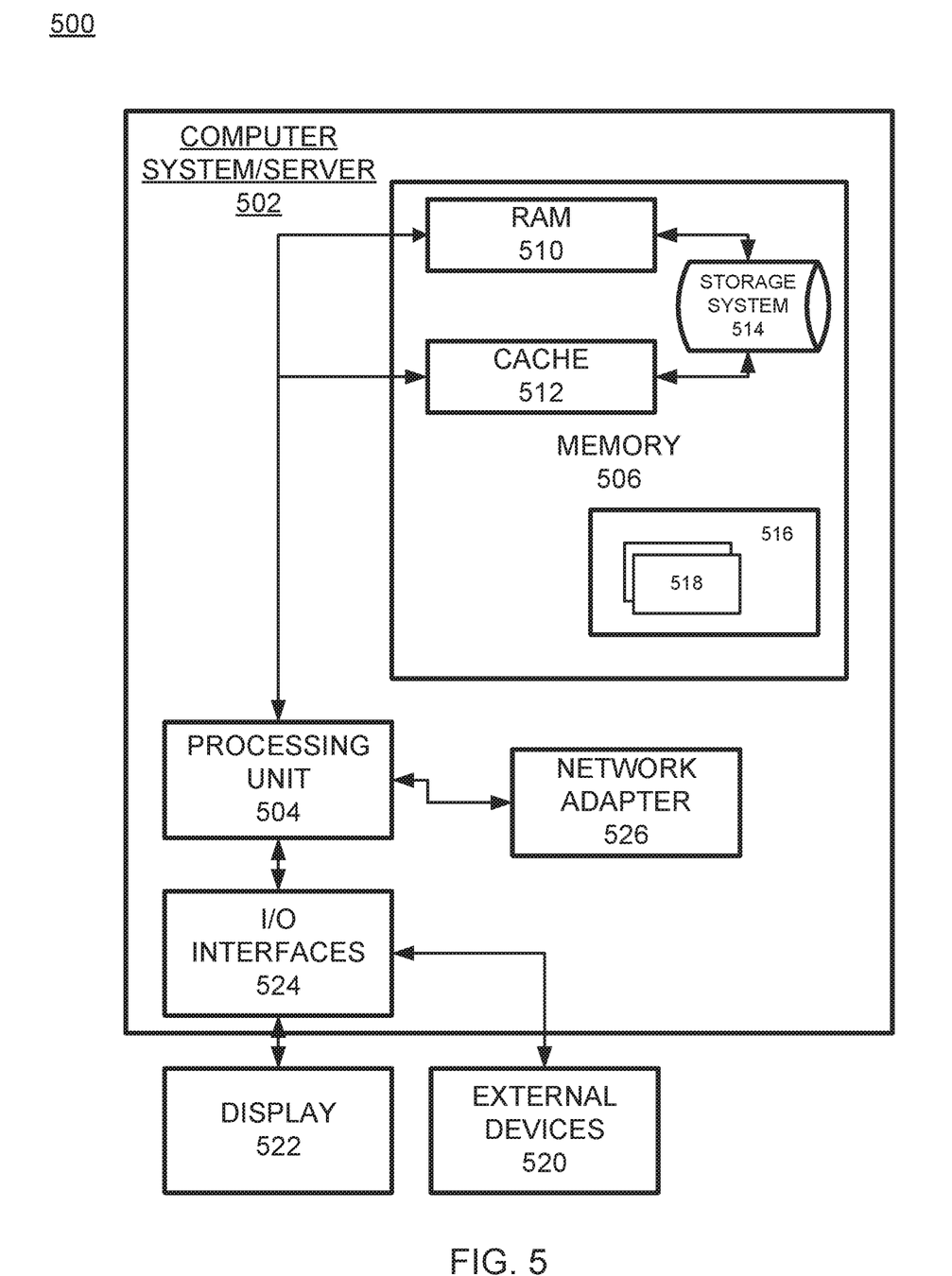
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagram of FIG. 3 and the flow chart of FIG. 4. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, via a scheduling engine, a request to reserve a new blockchain transaction from a blockchain node which is to be committed to a blockchain ledger of a blockchain network, wherein the scheduling engine operates on a server outside of the blockchain network;
   determining, via the scheduling engine, a size of the new blockchain transaction based on transaction attributes of the new blockchain transaction;
   determining that there is adequate space in an uncommitted block for the new blockchain transaction based on a total amount of block space reserved for the uncommitted block in a schedule and the size of the new blockchain transaction;
   in response, scheduling the new blockchain transaction to be committed to the blockchain ledger via the uncommitted block and storing the new blockchain transaction in a transaction buffer; and
   writing an entry in a schedule stored in a database which is available to blockchain nodes of the blockchain ledger and which reserves an amount of space required for the new blockchain transaction in the uncommitted block and includes a member identifier of the blockchain node which submitted the new blockchain transaction.

2. The method of claim 1, wherein other blockchain transactions are stored as entries in the schedule, and each entry in the schedule comprises:
   an amount of block data required for a respective transaction, a requester identification associated with a blockchain node that submitted the respective transaction, and a block number assigned to the respective transaction.

3. The method of claim 1, further comprising:
   identifying there is block space available in the uncommitted block for a second blockchain transaction submitted by a different blockchain node; and
   transmitting a block space reservation to a reservation service to prepare the second blockchain transaction for commitment to the blockchain ledger, responsive to identifying the block space is available.

4. The method of claim 3, further comprising:
   revoking the block space reservation responsive to identifying the second blockchain transaction will not be committed.

5. The method of claim 3, further comprising:
   storing the second blockchain transaction in a transaction buffer until the uncommitted block is ready to be committed.

6. The method of claim 3, further comprising:
   forfeiting available space in the uncommitted block when the block space reservation is created.

7. The method of claim 6, further comprising:
   retrieving the forfeited available space responsive to writing the second blockchain transaction to the uncommitted block.

8. An apparatus, comprising:
   a processor configured to:
   receive, via a scheduling engine, a new blockchain transaction from a blockchain node which is to be committed to a blockchain ledger of a blockchain network, wherein the scheduling engine operates on a server outside of the blockchain network;
   determining, via the scheduling engine, a size of the new blockchain transaction based on transaction attributes of the new blockchain transaction;
   determine that there is adequate space in an uncommitted block for the new blockchain transaction based on a total amount of block space reserved for the uncommitted block in a schedule and the size of the new blockchain transaction; and
   in response, schedule the new blockchain transaction to be committed to the blockchain ledger via the uncommitted block is available and store the new blockchain transaction in a transaction buffer; and
   write an entry in the schedule stored in a database which is available to blockchain nodes of the blockchain ledger and which reserves an amount of space required for the new blockchain transaction in the uncommitted block and includes a member identifier of the blockchain node which submitted the new blockchain transaction.

9. The apparatus of claim 8, wherein other blockchain transactions are stored as entries in the schedule, and each entry in the schedule comprises:
an amount of block data required for a respective transaction, a requester identification associated with a blockchain node that submitted the respective transaction, and a block number assigned to the respective transaction.

10. The apparatus of claim 1, wherein the processor is further configured to:
identify there is block space available in the uncommitted block for a second blockchain transaction submitted by a different blockchain node; and
transmit a block space reservation to a reservation service to prepare the second blockchain transaction for commitment to the blockchain ledger, responsive to identifying the block space is available.

11. The apparatus of claim 8, wherein the processor is further configured to:
revoke the block space reservation responsive to identifying the second blockchain transaction will not be committed.

12. The apparatus of claim 11, wherein the processor is further configured to:
store the second blockchain transaction in a transaction buffer until the uncommitted block is ready to be committed.

13. The apparatus of claim 11, wherein the processor is further configured to:
forfeit available space in the uncommitted block when the block space reservation is created.

14. The apparatus of claim 13, wherein the processor is further configured to:
retrieve the forfeited available space responsive to writing the second blockchain transaction to the uncommitted block.

15. A non-transitory computer readable storage medium configured to store one or more instructions that when executed by a processor cause the processor to perform:
receiving, via a scheduling engine, a request to reserve a new blockchain transaction from a blockchain node which is to be committed to a blockchain ledger of a blockchain network, wherein the scheduling engine operates on a server outside of the blockchain network;
determining, via the scheduling engine, a size of the new blockchain transaction based on transaction attributes of the new transaction;
determining that there is adequate space in an uncommitted block for the new blockchain transaction based on a total amount of block space reserved for the uncommitted block identified from a schedule and the size of the new blockchain transaction; and
in response, scheduling the new blockchain transaction to be committed to the blockchain ledger via the uncommitted block and storing the new blockchain transaction in a transaction buffer; and
writing an entry in the schedule stored in a database which is available to blockchain nodes of the blockchain ledger and which reserves an amount of space required for the new blockchain transaction in the uncommitted block and includes a member identifier of the blockchain node which submitted the new blockchain transaction.

16. The non-transitory computer readable storage medium of claim 15, wherein other blockchain transactions are stored as entries in the schedule, and each entry in the schedule comprises:
an amount of block data required for a respective transaction, a requester identification associated with a blockchain node that submitted the respective transaction, and a block number assigned to the respective transaction.

17. The non-transitory computer readable storage medium of claim 16, further configured to store one or more instructions that when executed by the processor cause the processor to perform:
identifying there is block space available for a second blockchain transaction submitted by a different blockchain node; and
transmitting a block space reservation to a reservation service to prepare the second blockchain transaction for commitment to the blockchain ledger, responsive to identifying the block space is available.

18. The non-transitory computer readable storage medium of claim 17, further configured to store one or more instructions that when executed by the processor cause the processor to perform:
revoking the block space reservation responsive to identifying the second blockchain transaction will not be committed.

19. The non-transitory computer readable storage medium of claim 17, further configured to store one or more instructions that when executed by the processor cause the processor to perform:
storing the second blockchain transaction in a transaction buffer until the uncommitted block is ready to be committed.

20. The non-transitory computer readable storage medium of claim 17, further configured to store one or more instructions that when executed by the processor cause the processor to perform:
forfeiting available space in the uncommitted block when the block space reservation is created.

* * * * *